United States Patent
Barois et al.

(10) Patent No.: US 12,166,539 B2
(45) Date of Patent: Dec. 10, 2024

(54) METHOD FOR TRANSMISSION IN A PLURALITY OF FREQUENCY BANDS BETWEEN TWO NEIGHBOURING DEVICES OF A NETWORK

(71) Applicant: SAGEMCOM ENERGY & TELECOM SAS, Rueil Malmaison (FR)

(72) Inventors: Jérôme Barois, Rueil Malmaison (FR); Ziv Roter, Rueil Malmaison (FR); Julien Barthes, Rueil Malmaison (FR); Clément Terrien, Rueil Malmaison (FR); Guillaume Bacri, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 210 days.

(21) Appl. No.: 17/362,357

(22) Filed: Jun. 29, 2021

(65) Prior Publication Data

US 2022/0006491 A1 Jan. 6, 2022

(30) Foreign Application Priority Data

Jul. 1, 2020 (FR) ........................................ 2006950

(51) Int. Cl.
*H04B 3/56* (2006.01)
*H04B 1/04* (2006.01)
*H04L 1/00* (2006.01)

(52) U.S. Cl.
CPC ............ *H04B 3/56* (2013.01); *H04B 1/0483* (2013.01); *H04L 1/0071* (2013.01); *H04B 2001/0491* (2013.01)

(58) Field of Classification Search
CPC ....................................................... H04B 3/54
See application file for complete search history.

(56) References Cited

U.S. PATENT DOCUMENTS

| | | | |
|---|---|---|---|
| 2012/0134395 A1* | 5/2012 | Varadarajan | H04B 3/542 375/220 |
| 2012/0189042 A1 | 7/2012 | Varadarajan et al. | |

(Continued)

FOREIGN PATENT DOCUMENTS

| | | | |
|---|---|---|---|
| EP | 2393213 A1 * | 12/2011 | ............. H04B 3/542 |
| EP | 3104569 A1 | 12/2016 | |

(Continued)

OTHER PUBLICATIONS

Feb. 24, 2021 Search Report issued in French Patent Application No. 2006950.

*Primary Examiner* — Kevin Kim
(74) *Attorney, Agent, or Firm* — Williams Mullen; R. Brian Drozd

(57) ABSTRACT

A method for transmitting data, in the form of messages, in a power line communication network, the method being executed in a first node device of said network configured so as to communicate in a plurality of separate frequency bands with a second node device of said network, the method comprising transmitting a message in a transmission mode using at least two separate frequency bands from among said plurality of separate frequency bands in parallel. It is thus possible to have a wider bandwidth by using various separate frequency bands in parallel. The invention also relates to a communication node device configured so as to execute the abovementioned method.

11 Claims, 11 Drawing Sheets

(56) References Cited

U.S. PATENT DOCUMENTS

2013/0182719 A1 7/2013 Vedantham et al.
2016/0127515 A1* 5/2016 Kim ...................... H04B 3/544
            370/254

FOREIGN PATENT DOCUMENTS

EP            3326294 B1 * 10/2020  ............. H04B 3/544
WO    WO-2013048619 A1 *  4/2013  ........... H04L 1/0041

* cited by examiner

METHOD FOR TRANSMISSION IN A PLURALITY OF FREQUENCY BANDS BETWEEN TWO NEIGHBOURING DEVICES OF A NETWORK

TECHNICAL FIELD

At least one embodiment of the present invention relates to a method for transmitting a message from a first node device to a second node device belonging to a network neighbourhood of the first node device, said first and second node devices belonging to a network using power line communications. At least one embodiment of the present invention relates to a device implementing the method.

PRIOR ART

Power line communications (PLC) are becoming more widespread, in particular in the context of AMM (abbreviation for "Automated Meter Management") electricity supply networks. Communication networks are thus implemented in electricity supply networks in order for a base node device (also called "data hub") of the network to automatically collect, from smart electricity meters, energy consumption reading data that said smart electricity meters are respectively responsible for monitoring.

The G3-PLC communication standard is defined so as to allow the various node devices (in particular data hub and smart electricity meters) of such a network to communicate with one another. The standard is specified in the ITU-T G.9903 recommendation, which describes in particular the physical layer (PHY) and the data link layer (DLL) of the OSI (acronym for "Open Systems Interconnection") model. The G3-PLC standard is intended to be used in frequency bands ranging from 10 to 490 kHz. More specifically, it supports the following frequency bands: the CENELEC A frequency band, which ranges approximately from 35 kHz to 91 kHz; the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz. These various frequency bands have different characteristics in terms of data rate, range, and resistance to interfering factors in particular.

However, the G3-PLC standard permits the use of only one of said frequency bands for a given node device. More precisely, modern node devices may sometimes support a plurality of frequency bands, but not at the same time. A reconfiguration is then required in order to change from a first frequency band to a second frequency band. Thus, when, in a communication network, it is necessary to reconfigure a set of data hub devices and a set of electricity meters associated therewith in a new frequency band, a reconfiguration may prove to be particularly complex. For example, a meter device that has not been able to receive a message telling it to change frequency band may become incapable of communicating with the data hub device with which it is associated after the latter has for its part been able to change frequency band.

However, the needs in terms of resources of communication networks, in particular in the deployment of AMM electricity supply networks, are increasing on a daily basis. The frequency band for which the elements forming a network have been certified may be at a capacity limit, thereby forming an obstacle to increasing the number of exchanges in the network, for example in order to introduce new functionalities or even new application needs, for example.

It is desirable to overcome these various drawbacks from the prior art. It is thus desirable in particular to propose a power line communication-based solution that makes it possible to increase the capacity for the number of exchanges in the communication network. It is in particular desirable to propose a solution that is applicable to AMM electricity supply networks.

SUMMARY OF THE INVENTION

To this end, one subject of the invention is a method for transmitting data, in the form of messages or data frames, in a power line communication network, the method being executed in a first node device of said network configured so as to communicate in a plurality of separate frequency bands with a second node device of said network, the method comprising transmitting a message in a transmission mode using at least two separate frequency bands from among said plurality of separate frequency bands in parallel.

Advantageously, it is thus possible to have a wider bandwidth by using various separate frequency bands in parallel.

The term "separate frequency band" in this case denotes a frequency band separate from another frequency band.

The advantages stemming from simultaneous use of a plurality of frequency bands are for example increasing the average speed of transmissions between two neighbouring nodes, and therefore more broadly through the communication network, optimized distribution of the load of the network over a plurality of frequency bands, and better communication in an environment subjected to interference.

The method according to the invention may also comprise the following features, considered on their own or in combination:

The transmission of a message in a transmission mode using at least two separate frequency bands in parallel comprises using a frequency band called "extended frequency band" comprising at least two separate frequency bands from among said plurality of separate frequency bands, each separate frequency band comprising a plurality of subcarriers, the method furthermore comprising a step of interleaving the data in a message to be transmitted, designed to transmit said data distributed on all of said subcarriers. Advantageously, it is thus possible to use a plurality of frequency bands simultaneously while at the same time addressing the hardware means that are used by referring to an extended frequency band, in a manner similar to what is performed for communications in a single frequency band.

Again advantageously, addressing a single frequency band, that is to say the extended band that comprises a plurality of separate frequency bands, makes it possible to simplify the management of interference. It is thus possible to overcome any temporal interference (starting up of an apparatus, for example) or frequency interference (presence of electromagnetic interference only at some frequencies).

The abovementioned data interleaving operation comprises:
i) obtaining a first interleaving table T [m, n] of bits representative of the data to be transmitted, the first table comprising the same number of second interleaving tables Ti [$m_i$, $n_i$] of bits as there are separate frequency bands contained in the extended band, each second interleaving table Ti [$m_i$, $n_i$] being assigned to just one of the at least two separate frequency bands of the extended frequency band, the dimensions $m_i$, $n_i$ of each of the second interleaving tables Ti [$m_i$, $n_i$] being defined in accordance with a modulation type used for the transmission of the data in the separate frequency band to which a second interleaving table is assigned, any differences in dimensions between second interleaving tables being liable to generate one or more positions that are said to be invalid, contained in the first interleaving table but not contained in at least one of the second interleaving tables, ii) interleaving the bits by successively shifting the rows m and columns n of the first interleaving table T [m, n], the successive shifts being performed in the form of circular permutations of the bits respectively by row and by column, iii) moving any bit detected as being present at an invalid position of the first interleaving table to a position of a said second interleaving table that is available following the interleaving of the bits of the first interleaving table, such that each second interleaving table comprises bits assigned to one of said groups of data, iv) directing the bits of each of the groups of data to electronic circuitry configured so as to modulate and transmit said bits.

Step ii) for interleaving the bits and the dimensions of the second interleaving tables are in accordance with the ITU-T G.9903 recommendation.

It is thus possible to address an extended frequency band comprising a plurality of separate frequency bands using node devices whose architecture is close to the architecture of existing node devices, compatible with the communication standard known as G3-PLC.

The transmission in the transmission mode using at least two separate frequency bands in parallel uses a communication mode called "hyper-robust" mode, comprising the following steps, implemented by the first node device:

transmitting the message to the second node device on a first separate frequency band from among the plurality of separate frequency bands, the message being modulated in robust mode, a modulation in robust mode comprising, in succession, a Reed-Solomon coding operation, a convolutional coding operation, a code repetition coding operation and a BPSK modulation; and, transmitting the message to the second node device on at least one second separate frequency band from among said plurality of separate frequency bands, the method being modulated in robust mode and the first and second separate frequency bands being different.

Thus, in the event of strong interference on one separate frequency band, the message may still be transmitted successfully on another separate frequency band. Specifically, the second node device only needs to receive the message on one of the separate frequency bands on which said message was transmitted in parallel. This transmission mode is therefore particularly advantageous in the event of strong interference.

The method comprises a mode of transmitting a message in the form of fragments, and to this end comprises the following steps:

fragmenting the message to be transmitted between the first node device and the second device into at least a first fragment and a second fragment;

associating a first separate frequency band from among the plurality of separate frequency bands with the first fragment and a second separate frequency band from among the plurality of separate frequency bands with the second fragment, the first and second separate frequency bands being different; and, transmitting each of the first and second fragments on the frequency bands with which it is associated.

Using a plurality of frequency bands to send a message thus makes it possible to benefit from the characteristics of the various frequency bands in terms of data rate, range and resistance to interfering factors. The transmission method then makes it possible to increase the capacity for the number of exchanges in the network.

The method comprises the following steps:

receiving, from a third node device, a fragment of a message in a first separate frequency band from among said plurality of separate frequency bands, selecting a frequency band other than the first frequency band from among the set of frequency bands and which is a frequency band on which a second node device is able to transmit and receive messages, relaying the fragment in the selected second separate frequency band to the second node device.

The message transmission latency linked to using a single frequency band for a given geographical region is thus greatly reduced.

The method comprises the following steps prior to the transmission of the message:

estimating, for each separate frequency band, a transmission duration of said message in this frequency band, obtaining, from a database, occupancy level integration results for each frequency band, determined during a plurality of time scales corresponding to the theoretical transmission duration of the message in each frequency band, selecting a frequency band based on the occupancy level integration results for each frequency band determined during a plurality of obtained time scales, and transmitting the message in the selected frequency band.

This makes it possible to benefit from the advantages of the various frequency bands in terms of data rate, range and resistance to interfering factors.

The second node device is reachable from the first node device through at least two different communication routes, and the method comprises:

obtaining a route cost for each of said communication routes; and selecting, from among said communication routes, the communication route corresponding to the smallest route cost.

This makes it possible to express the route cost gain resulting from a multi-band approach in a configurable manner. Specifically, a link cost in a given direction depends on the cost of the link, in the given direction, calculated for each frequency band.

The method comprises the following steps:

transmitting a copy of a first message to the second node device in each of said at least two separate frequency bands, the first message comprising information according to which a channel estimate is requested from the second node device by the first node device, receiving a second message transmitted by the second node device on each separate frequency band via which the second node device has received a said copy of the first message, each second message comprising information representative of a channel estimate for the separate frequency band via which said second message is received, the first node device recording the information, representative of the channel estimate, contained in each received second message, and determining, based on the recorded information, a transmission mode for transmitting a third message to be transmitted subsequently from the first node device to the second node device.

It is thus possible, for a given node device, to determine the transmission capabilities of its neighbouring node devices and, on the basis of the capability of the neighbouring node devices, to use a plurality of frequency bands simultaneously in order to optimize communication performance in the network.

The at least two separate frequency bands are chosen from among the following group: CENELEC A frequency band, CENELEC B frequency band, and FCC frequency band or ARIB frequency band.

The power line communication network is a meshed G3-PLC network.

Another subject of the invention is a node device intended to be used in a power line communication network, the node device being configured so as to communicate in a plurality of separate frequency bands with a second node device of said network and being configured so as to apply a transmission mode for transmitting in parallel in at least two separate frequency bands from among a plurality of separate frequency bands.

Advantageously, the node device is configured so as to communicate in a plurality of separate frequency bands with a second node device of the network and to apply a transmission mode for transmitting in a frequency band called "extended frequency band", the extended frequency band comprising at least two frequency bands from among the plurality of separate frequency bands, each separate frequency band comprising a plurality of subcarriers, the node device comprising electronic circuitry configured so as to:

distribute data to be transmitted in the extended frequency band into a plurality of groups of data via an interleaving operation, each group being assigned to just one of said at least two separate frequency bands, and data in each of the groups being assigned to each of the subcarriers of the frequency band to which the group is assigned, transmit the data in each of the plurality of groups of data in the separate frequency band to which the group is assigned such that the data transmission is carried out jointly on all of the subcarriers of the at least two frequency bands.

Advantageously, the at least two separate frequency bands in which the node device is able to communicate are chosen from among the following group: CENELEC A frequency band, CENELEC B frequency band, and FCC frequency band or ARIB frequency band, and the dimensions of the second interleaving tables are in accordance with the ITU-T G.9903 recommendation.

Another subject of the invention is a power line communication network comprising a plurality of node devices as described above.

Another subject of the invention is a computer program product comprising program code instructions for executing the steps of the method described above when the program is executed by a processor, and also an information storage medium comprising such a computer program product.

BRIEF DESCRIPTION OF THE DRAWINGS

The abovementioned features of the invention, and others, will become more clearly apparent on reading the following description of at least one exemplary embodiment, said description being given with reference to the appended drawings, in which.

DETAILED DESCRIPTION OF EMBODIMENTS

Figure 1:
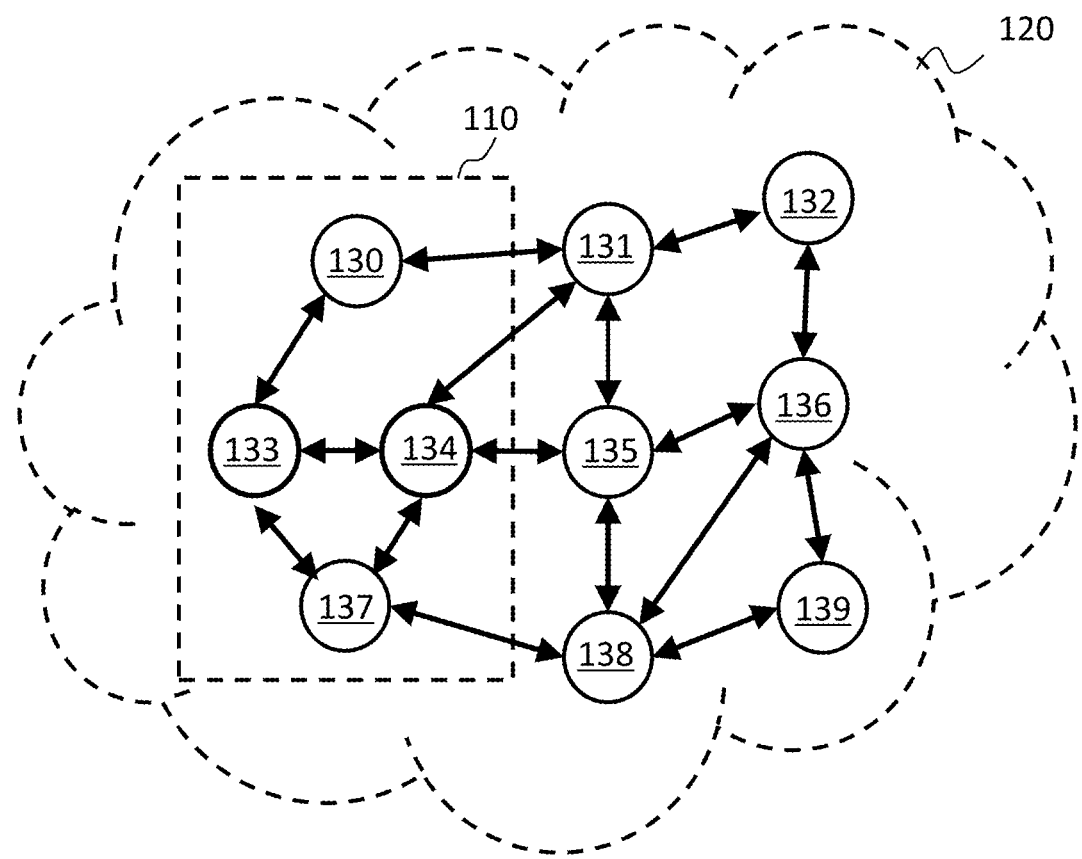
FIG. 1 illustrates an electricity supply network using power line communications, comprising a device implementing the method according to the invention.

FIG. 1 schematically illustrates a communication network 120. The communication network 120 is based on power line communications PLC. The communication network 120 is for example an AMM electricity supply network allowing a base node device (also called "data hub") to collect, from smart electricity meters, energy consumption reading data for electrical installations that said smart electricity meters are respectively responsible for monitoring. The data hub and the smart electricity meters are thus node devices of the communication network 120. The communication network 120 may comprise other node devices, for example installed in electrical transformers.

The communication network 120 has a meshed structure. The meshed structure of the communication network 120 is shown schematically in FIG. 1 through arrows representing the communication links between two neighbouring nodes, and in which some node devices act as a relay so as to increase the communication range in the communication network 120. One and the same smart electricity meter thus potentially has a plurality of routes for reaching the data hub, and vice versa.

The present invention is therefore particularly suited to the context of G3-PLC technology. The communication network 120 thus comprises a plurality of node devices 130, 131, 132, 133, 134, 135, 136, 137, 138, 139. A network neighbourhood is associated with each of the node devices of the communication network 120. For example, the node device 133 in FIG. 1 is associated with a network neighbourhood 110 incorporating the node devices 130, 134 and 137. In the communication network 120, a signal or a message broadcast by a node device, such as for example the node device 133, is not generally visible at any point of the communication network 120. Each node device transmitting signals or messages then has a network neighbourhood, that is to say a subset of the communication network 120, in which any node device is able to intelligibly receive the signals or messages directly from the node device that broadcast these signals or messages. The network neighbourhood corresponds to the range of the transmitted signals, depending on predetermined transmission parameters (for example power, modulation and coding scheme, network topology, etc.) of the node device at the source of the signals and also potentially depending on characteristics of the communication channel, such as for example an attenuation, a noise level or an impedance.

The communication network 120 is based on a reactive routing protocol, such as for example the LOADng ("Lightweight On-demand Ad hoc Distance-vector Routing Protocol —Next Generation protocol"). In contrast to proactive routing protocols, which are based on overall network topology knowledge, reactive routing protocols are based on on-demand route discoveries, each node device of the network then needing only to know its own network neighbourhood in order to route data in the communication network 120. To discover an appropriate route in the communication network 120 from a source node device (for example the node device 133) to a destination node device (for example the node device 132), it is known that the source node device broadcasts a discovery request, called RREQ ("Route REQuest"). This route discovery request is received by each node device in the network neighbourhood of said source node device. Each node device in the network neighbourhood of said source node device relays said copy of the request through broadcasting if said node device in question is not the destination node device. Through step-by-step broadcasting, a plurality of copies of the route discovery request are typically received by the destination node device, each of these copies having taken a different path in the communication network 120.

The use of routing tables stored in the node devices makes it possible to perform point-to-point or unicast communications between any pair of node devices of the communication network 120. Intermediate node devices therefore serve as a relay when the node devices of said pair are not in the network neighbourhood of one another, and the communications thus take place step-by-step, each node device using one of its own neighbours to track messages to their respective intended recipients.

For communication between neighbouring node devices (that is to say node devices that are in the network neighbourhood of one another), the messages are transmitted in the form of modulated frames. When a modulated frame is addressed specifically to a neighbouring node device and it is demodulated correctly thereby, said neighbouring node device retransmits an acknowledgement ACK to the node device that addressed said modulated frame thereto. The acknowledgement ACK is transmitted on the same frequency band as the modulated frame with which said acknowledgement ACK is associated.

A plurality of frequency bands are defined in order to support the transmission of these modulated frames, an appropriate modulation scheme being associated with each of these frequency bands. Each frame transmitted in the form of modulated signals begins with a predefined preamble depending on the modulation scheme in accordance with which said signals were modulated. The preamble is designed to make it possible to perform synchronization at reception on said frame, that is to say to be able to determine an effective frame start time. To this end, the preamble typically comprises a plurality of successive copies of one and the same symbol. The effective content and the duration of the preamble are thus predefined and depend on the modulation scheme that is used. The preambles of a plurality of frames are identical when the same modulation scheme is applied, and differ if not.

The applicable modulation schemes (and corresponding demodulation schemes) are preferably OFDM ("Orthogonal Frequency Division Multiplex") multi-carrier modulation schemes (respectively demodulation schemes).

In terms of frequency bands able to be used in the context of implementing the communication network 120, mention may be made of the following: the CENELEC A frequency band, which ranges approximately from 35 kHz to 91 kHz: the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz. It is then possible to use: a first modulation scheme with thirty-six carriers in the CENELEC A frequency band; a second modulation scheme with seventy-two carriers in the FCC frequency band; a third modulation scheme with fifty-four carriers in the ARIB frequency band; and a fourth modulation scheme with sixteen carriers in the CENELEC B frequency band. It is apparent from the above that a node device may simultaneously use a plurality of separate frequency bands to communicate with one or more of its neighbours by applying an appropriate transmission mechanism. However, it appears that the ARIB and FFC frequency bands cannot be used simultaneously by one and the same node device, given that they overlap.

Advantageously, at least some of the node devices 130, 131, 132, 133, 134, 135, 136, 137, 138, 139 are configured so as to communicate in a plurality of separate frequency bands. It is therefore important, for a given node device, to be able to determine which communication modes are supported by a node device in its network neighbourhood. The term "supported communication modes" denotes one or more native communication modes of a node device, that is to say that said node device is capable of implementing due to its possible configurations, and also means that these one or more native communication modes are able to be used at a given time, given the possible interference that may exist. The interference may originate for example from a noisy environment.

A message exchange in accordance with a predefined protocol for example allows a first node device to obtain information with regard to the communication capabilities of a neighbouring second node device. For example, the first node device addresses to the neighbouring second node device a copy of a first message in each of the frequency bands in which it is able to communicate due to its configuration, and the neighbouring node device is configured so as to recognize such a message and to respond thereto through a second message in each of the frequency bands in which it was able to receive it.

In a G3-PLC context, for example, the copies of the first message contain information according to which a channel estimate is requested from the neighbouring node device, for the frequency band in which it received the message (called "Tone Map" request). Advantageously, the information according to which a channel estimate is requested from the neighbouring second node device by the first node device is then a Tone Map Request indicator of a frame control header defined in accordance with the ITU-T G9903 recommendation. The neighbouring second node device will thus respond to the Tone Map Request request by sending, to the first node device, in each of the frequency bands in which it received a copy of the first message, a second message comprising information representative of at least one channel estimate in the form of a Tone Map Request data block as defined in accordance with the ITU-T G9903 recommendation.

The first device may therefore ascertain and store information with regard to the frequency bands that it is able to use to communicate with the neighbouring second node device. Advantageously, some of the node devices 130 to 139 are configured so as to implement at least one communication mode using a plurality of separate frequency bands in parallel. The node device 133, for example, is thus configured so as to communicate in a single separate frequency band, in parallel in a plurality of separate frequency bands (multi-band) or else in an extended frequency band.

According to one embodiment of the invention, at least some of the node devices 130, 131, 132, 133, 134, 135, 136, 137, 138, 139 supporting communication modes for communicating in a plurality of separate frequency bands also support a communication mode for communicating in a frequency band called "extended frequency band". An extended frequency band advantageously comprises a plurality of separate frequency bands. An extended frequency band may thus comprise two, three or four separate frequency bands, for example, or even more. Each separate frequency band uses a plurality of subcarriers.

Determining the capability of a neighbouring node device to communicate in an extended frequency band is similar to what is described above for determining the various communication modes supported by a device, considering that the extended frequency band is commonly defined between the various neighbouring node devices of the communication network. Thus, according to one embodiment, the extended frequency band may be defined as comprising the CENELEC A frequency band, the CENELEC B frequency band and the FCC band. According to one variant, the extended frequency band may be defined as comprising the CENELEC A frequency band, the CENELEC B frequency band and the ARIB band. A first node device may therefore transmit a channel estimate request (called "TONE MAP" request) in the extended frequency band in order to determine whether a neighbouring second node device supports communications in the extended frequency band.

Figure 2:
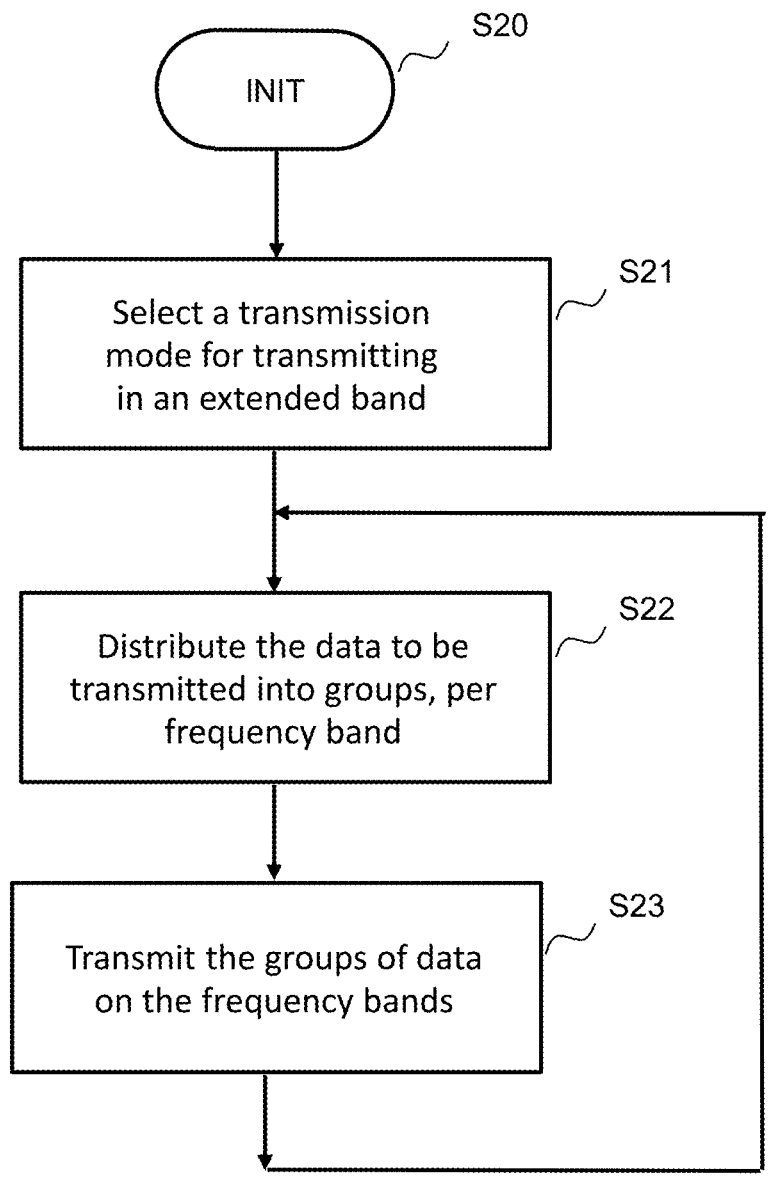
FIG. 2 is a flowchart illustrating a first embodiment using a transmission in an extended frequency band.

FIG. 2 illustrates a method for transmission in an extended frequency band according to a first embodiment. The illustrated method is executed in one, the first, of the node devices of the communication network 120, configured so as to support a transmission mode for transmitting in an extended frequency band, and which communicates with a neighbouring second node device, which is itself also configured so as to communicate in an extended frequency band. The first node device in which the method is executed is for example the node device 133 that communicates with the neighbouring second node device 134.

At the end of an initialization step S20, the first and second node devices 133 and 134 are configured so as to communicate with one another in at least one communication mode for communicating in at least one frequency band. It is considered that the devices are then normally operational, at this stage, and that a message exchange may be initiated. According to one embodiment, the first node device 133 is configured, in a step S21, so as to implement communications in an extended frequency band. This configuration is achieved for example through writing of an extended frequency band validation indicator by a control module of the first node device 133. According to one embodiment, this indicator is a bit set to "1" in a configuration register of the node device 133 that controls interleaving of data to be transmitted in an interleaving mode specific to a transmission in an extended frequency band.

The configuration of the first node device 133 in a communication mode for communicating in an extended frequency band may be performed for example after the first node device 133 has addressed a channel estimate request, said request comprises an indicator according to which an extended frequency band is involved in this request, and the second node device 134 has then responded to this request by telling the first node device 133 that it is indeed compatible with communication in an extended frequency band. The neighbouring second node device 134 for example responds in the form of a message containing information representative of a channel estimate, on each of the frequency bands contained in the extended frequency band as defined by the first node device 133.

According to one variant, the first node device 133 is natively designed to implement communications in an extended frequency band, such as the frequency band defined in the present description, and no specific configuration of the first node device 133 is required after an initialization phase following turning on.

It is thus considered that the node device 133 is configured so as to communicate in an extended frequency band at the end of initialization step S20 and applies a communication mode for communicating in an extended frequency band, whether this required specific configuration (selection of a communication mode, for example) or whether this configuration is native, that is to say inherent to the design of the first node device 133 and to the various electronic circuits forming it.

Of course, the first node device 133 is configured so as to implement any message or protocol signal exchange intended to organize and manage the sharing of the network with other node devices. Such exchanges are thus intended to request access to the network, or else to record information relating to the communication capabilities of the neighbouring node devices, such as the second node device 134 for example.

The data to be transmitted in an extended frequency band are distributed into each of the separate frequency bands of the defined extended band in a step S22. In this step S22, the data are distributed into various groups of data. The data in each of the various groups are intended to be transmitted in a single frequency band assigned to the group. It is considered here, indiscriminately, that a group of data is assigned to just one of the frequency bands contained in the extended frequency band, or vice versa. According to one embodiment, the distributed groups of data are sets of bits b1, b2, b3, b4, . . . , bi, . . . bn originating from a serial flow of bits.

For example, the data thus presented in the form of a serial flow originate from a convolutional encoder, such as a Viterbi encoder.

Advantageously, the data to be transmitted in an extended frequency band are distributed into a plurality of groups during a step of interleaving the data. The step of interleaving the data is performed by what is called "interleaver" circuitry. According to one embodiment, the interleaving is advantageously performed based on an input interleaving table comprising a plurality of output interleaving tables, as explained further on in the present description.

After the described interleaving is performed in the first node device 133, the data grouped together (distributed) into the same number of output interleaving tables of the interleaver as there are separate frequency bands contained in the extended frequency band are addressed to modulators of the first node device 133 each operating in one of the various separate frequency bands. The data are thus transmitted to the neighbouring second node device 134 in parallel and simultaneously by the various modulators of the first node device 133.

The second node device 134, configured so as to receive the data in an extended band, that is to say simultaneously in the same separate frequency bands as those used for the transmission, operates in the inverse manner. In other words, the second node device 134 demodulates the data received in each of the separate frequency bands, de-interleaves the data in an inverse manner to what is performed by the interleaver of the first node device 133, and then delivers a serial flow of bits to a Viterbi decoder, where applicable, of the second node device 134.

The flowchart of FIG. 2 looping back to the start of S22 illustrates processing continuity between successive data interleaving operations in step S22 and the transmission of these same data distributed into groups in an extended frequency band in step S23, that is to say in parallel on a plurality of separate frequency bands and jointly using all of the subcarriers of each of the separate frequency bands of the extended band. The flow of bits at the input of the interleaver is thus processed in successive portions of bits. While the bits are being interleaved, previously interleaved bits are transmitted by the modulators.

According to one embodiment, in the event of a transmission problem, the first node device 133 may be reconfigured into a communication mode other than a communication mode for communicating in an extended band, or else may transmit via a neighbouring node device other than the neighbouring second node device 134. The various steps of determining the quality of the transmission and/or reconfiguring the first node device 133 are not shown in FIG. 2 as they are not useful to the understanding of the invention.

As indicated, the data to be transmitted in an extended frequency band are cleverly distributed during an interleaving operation so as in particular to simplify the adaptation of existing node devices to support transmission in an extended frequency band.

Figure 3:
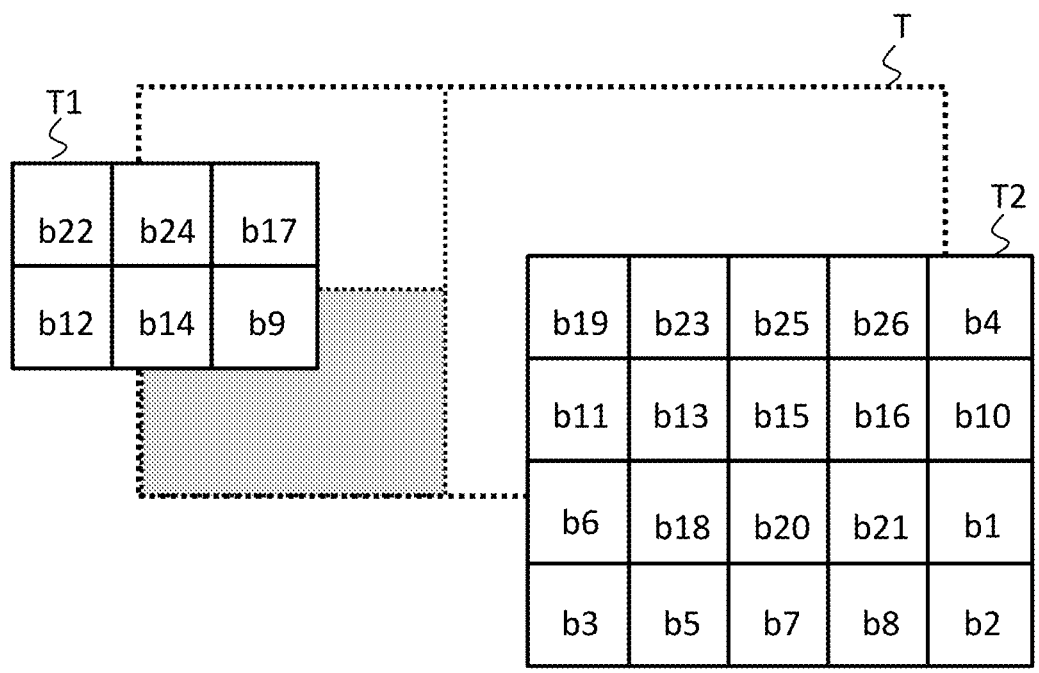
FIG. 3 is a schematic depiction of interleaving of data suitable for communication in an extended frequency band, according to the first embodiment.

FIG. 3 shows an interleaving table T configured so as to interleave data for communication in an extended frequency band. The interleaving table T is obtained by concatenating a first interleaving table T1 and a second interleaving table T2.

The first interleaving table T is the input table of the interleaver used by the transmission method described in FIG. 2, and the interleaving tables Ti and T2 are output tables of the interleaver that are used for the transmission of the groups of data distributed to the various modulators through the executed method. In the example described, two modulators are used to transmit the data in two separate frequency bands of the extended frequency band as defined.

Cleverly, the interleaving tables T1 and T2 have respective dimensions (number of rows $m_i$ and columns $n_i$) that are defined based on the modulation types used in each of the separate frequency bands of the extended frequency band. According to one embodiment, a first modulator uses a BPSK (abbreviation for "Binary Phase Shift Keying") modulation for the first frequency band and a second modulator uses a QPSK (abbreviation for "Quadrature Phase Shift Keying") modulation. The interleaving table T1 thus corresponds to an interleaving table as defined for example in accordance with the G3-PLC standard for a BPSK modulation, and its dimensions are defined by 2 rows and 3 columns. Similarly, the interleaving table T2 corresponds to an interleaving table as defined for example in accordance with the G3-PLC standard for a QPSK modulation, and its dimensions are defined by 4 rows and 5 columns. According to the G3-PLC standard, the dimensions of an interleaving table are defined such that the number of columns is equal to the number of subcarriers used in the frequency band used to transmit the data, and the number of rows depends on the number of bits to be interleaved. This number of bits to be interleaved is therefore determined according to the number of bits coded by a symbol depending on the modulation type used, and by the number of subcarriers used to transmit the symbols. Cleverly, according to the exemplary definition of the first interleaving table T, the first interleaving table T is obtained by concatenating the second interleaving tables T1 and T2 that would be used for interleaving the data with a view to transmission in a single separate frequency band, respectively in BPSK mode for the second interleaving table T1 and in QPSK mode for the second interleaving table T2. Indices T1-11 to T1-13 index the various positions of the first row of the second interleaving table T1, and indices T1-21 to T1-23 index the various positions of the second row of the second interleaving table T1. In the same way, indices T2-11 to T2-15 index the various positions of the first row of the second interleaving table T2, indices T2-21 to T2-25 index the various positions of the second row of the second interleaving table T2, indices T2-31 to T2-35 index the various positions of the third row of the second interleaving table T2 and indices T2-41 to T2-45 index the various positions of the fourth row of the second interleaving table T2. The abovementioned indices are not shown in FIG. 3, but may be used for a good understanding of the use of the tables according to the embodiment described here. Thus, more generally, an index Ti $[m_i, n_i]$, in the present description, indexes a position at the $m^{th}$ row and the $n^{th}$ column of the table Ti. The abovementioned indices therefore index the various positions of the interleaving table T obtained by concatenating the interleaving tables T1 and T2 in FIG. 3 in order to better illustrate the concatenation mode that is used. According to one embodiment, the second interleaving tables T1 and T2 are concatenated such that the table whose columns correspond to the lowest-frequency subcarrier bands is situated on the left. The second interleaving tables T1 and T2 are concatenated so as to define the first table T by matching the first row of the second interleaving table T1 to the first row of the second interleaving table T2, and then the second row of the second interleaving table T1 to the second row of the second interleaving table T2. The definition of the first interleaving table T thus corresponds to the addition of the second interleaving table T1 and of the second interleaving table T2 plus a third interleaving table T' (shown greyed out in FIG. 3), such that the first interleaving table T has the same number of positions in each of its columns and in each of its rows. In order to simplify the interleaving operations according to the described embodiment, the positions contained in the table T' (positions that appear greyed out in FIG. 3), contained in the first interleaving table T but not contained in at least one of the second interleaving tables T1 and T2, are said to be "invalid" since, after interleaving performed in the first interleaving table T, some data (bits) could be moved into one of these positions.

Specifically, an interleaving operation in an interleaving table usually consists in shifting the content of each of the rows and columns a certain number of times through circular permutations of the bits contained in the positions of the table. Each row is conventionally shifted a number of times different from the other rows and each column is conventionally shifted a number of times different from the other columns.

Bits b1 to b26 of a flow of bits are first of all "loaded" from left to right and from top to bottom into the first interleaving table T, prior to an interleaving operation, such that invalid positions are ignored. Bit b1 is loaded into the position T-11, b2 is loaded into the position T-12, . . . b13 into the position T-25, . . . and b26 into the position T-48. The invalid positions T-31, T-32, T-33, T-41, T-42 and T-43 of the first interleaving table T are ignored for the loading of the bits b1 to b26. The first interleaving table T is thus obtained, comprising the second interleaving tables T1 and T2, ready for an interleaving operation intended to distribute the loaded data (bits b1 to b26) into a plurality of groups of data each assigned to a separate frequency band. After the overall interleaving operation, bit b22 for example occupies the position occupied by bit b1 before the interleaving, bit b24 for example occupies the position occupied by bit b2 before the interleaving, bit b23 for example occupies the position occupied by bit b5 before the interleaving, etc., and so on. Since the interleaving was performed in whole rows and columns of the first interleaving table T, this means that invalid positions may contain bits following the interleaving.

According to the embodiment, these bits are then moved to valid positions of the first interleaving table T.

According to one embodiment, these movements are performed by running through the invalid positions of the table T' from top to bottom and from left to right. As soon as an invalid position contains a bit bi, said bit is moved to the first encountered available valid position by running through the first interleaving table T from top to bottom and from left to right.

Cleverly, each of the second interleaving tables T1 and T2 comprises a group of bits of data distributed into groups each corresponding to a separate frequency band contained in the extended frequency band. In other words and according to the described example, the bits contained in the second interleaving table T1 are transmitted to the first modulator with a view to transmission in BPSK mode in a first separate frequency band of the extended band, and the bits contained in the second interleaving table T2 are transmitted to the second modulator with a view to transmission in QPSK mode in a second separate frequency band of the extended band. Each of the columns of the second interleaving tables corresponds to a subcarrier of the frequency band assigned to the group of data. The interleaving thus also distributes the data in each group onto the various subcarriers of the frequency band used to transmit the data in the group.

According to one embodiment, the bits are respectively transmitted by way of serial flows to the modulators, via buffer memory areas (also called buffers or registers).

According to one variant, the bits are in fact transmitted to input buffers respectively associated with the modulators, the input buffers of the modulators directly being the second interleaving tables T1 and T2.

FIG. 3 in reality illustrates the distribution into groups of the first interleaving table T into two second interleaving tables T1 and T2 after the operations of interleaving and processing (moving) the bits present at invalid positions, where applicable. This breakdown advantageously corresponds to the end of the interleaving that is useful to distributing the data to be transmitted in the extended frequency band into the two separate frequency bands used according to the described example.

The illustrated breakdown of the first interleaving table T into two second interleaving tables T1 and T2, at the end of the interleaving, constitutes directing of the data in the form of bits of each of the groups of data (therefore of each of the second interleaving tables T1 and T2) to electronic circuitry configured so as to modulate and transmit the bits. The electronic circuitry dedicated to each of the separate frequency bands in particular comprises the modulator operating so as to transmit in this separate frequency band. Although the embodiment described above illustrates a transmission in an extended frequency band comprising two separate frequency bands, the reasoning is similar with regard to a distribution of data to be transmitted into three, four or even more separate frequency bands. The first (largest) interleaving table T thus comprises the same number of second interleaving tables T1, T2, Ti as there are separate frequency bands contained in the extended frequency band. According to one preferred embodiment, the second interleaving tables T1, T2, Ti, the respective dimensions of which are defined depending on the modulation type used on each of the separate frequency bands contained in the extended frequency band, are concatenated such that the table that comprises the lowest subcarriers is positioned on the left in the first interleaving table T, and the table that comprises the highest subcarriers is positioned on the right in the first interleaving table. Any intermediate second interleaving tables are arranged from left to right, in ascending order of frequency of the subcarriers that they comprise. Furthermore, the first rows of each of the second tables T1, T2, Ti are aligned with the top first row of the first interleaving table T.

Of course, the matrix-like depiction of the interleaving tables T, T1, T2 and of the table T' are intended to simplify understanding of the layout of the data for the described interleaving operations, and each of the tables could be depicted in the form of a vector of bits, for example a horizontal or vertical one, comprising segments defining the rows and columns described above. The depiction of the positions of the processed bits may be arbitrary, where the operations performed on the bits correspond to the interleaving principles described above. Specifically, the positions of the bits in the tables conventionally correspond to cells of registers or a random access memory of electronic interleaving circuitry.

Figure 4:
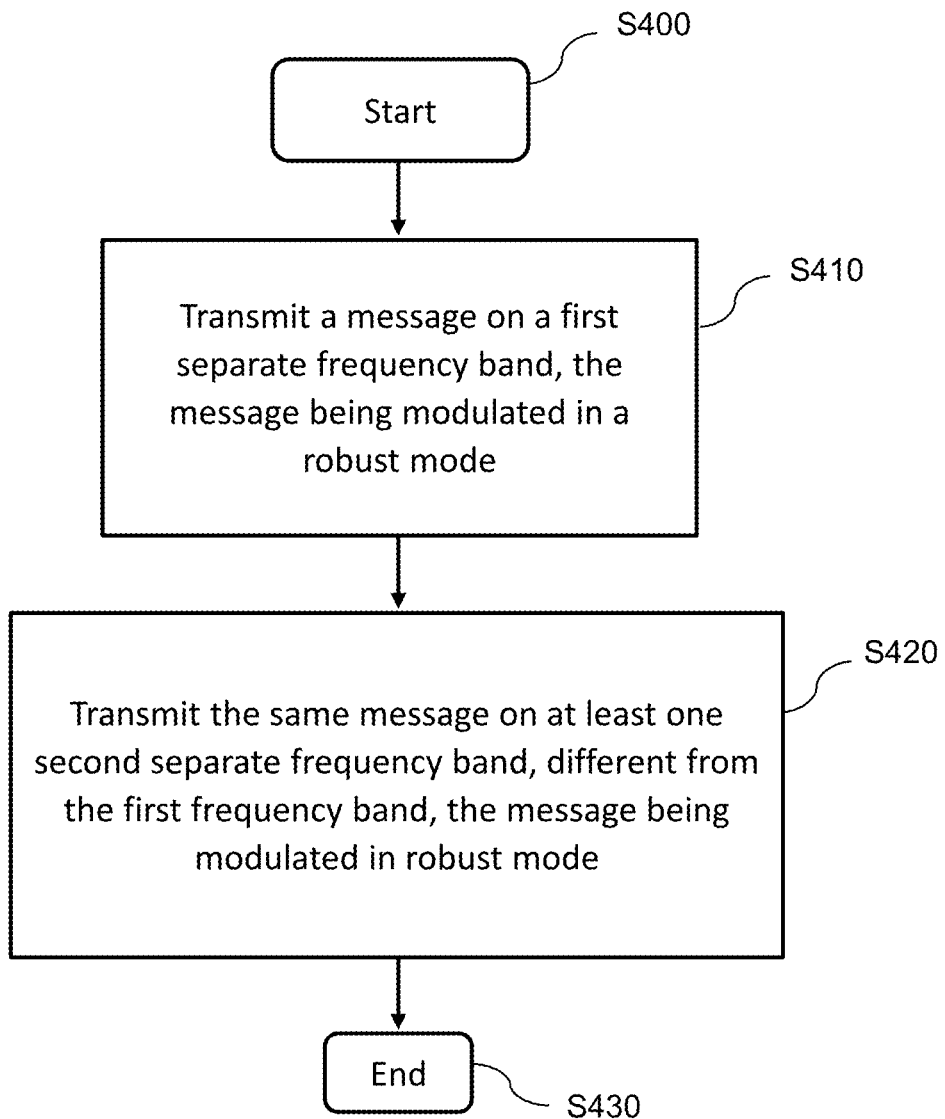
FIG. 4 is a flowchart illustrating a second embodiment using a transmission in a robust communication mode for communicating in multi-band mode.

FIG. 4 illustrates a method for transmitting a message M or a data frame in a hyper-robust communication mode called "H-ROBO", according to a second embodiment. The message M is to be transmitted in the H-ROBO mode by a source node device (for example the node device 133) to a receiver node device belonging to its network neighbourhood (for example the node device 134). In this embodiment, the two node devices 133 and 134 are configured so as to communicate in multi-band mode and have implemented protocol exchanges resulting in a choice to communicate in hyper-robust communication mode H-ROBO.

The method then starts in a step S400. In a step S410, the source node device 133 transmits the message M to the receiver node device 134 on a first separate frequency band from among the plurality of separate frequency bands comprising at least two frequency bands, the message M being modulated in the robust communication mode.

In a step S420, the source node device 133 transmits the same message M to the receiver node device 134 on a second separate frequency band from among the plurality of separate frequency bands, the message M again being modulated in the robust mode. It should be noted that the second separate frequency band is different from the first separate frequency band.

The first and second separate frequency bands are for example selected from a plurality of separate frequency bands defined in the G3-PLC standard, i.e. CENELEC A, CENELEC B, and ARIB or FCC. According to one variant, the first and second separate frequency bands are selected from a subset of frequency bands defined in the G3-PLC standard, the subset comprising at least two separate frequency bands from among all of the bands defined in the G3-PLC standard.

The method then ends in a step S430.

The hyper-robust mode H-ROBO therefore uses various separate frequency bands by transmitting one and the same message M or a data frame simultaneously on these various frequency bands. The robust mode is used in each frequency band. Advantageously, the hyper-robust mode is used when communication between neighbouring nodes is difficult, for example when a value of a quality indicator LQI for the link in question is lower than a predetermined threshold value.

The source node device 133 and the receiver node device 134 are specifically each based on LQI values received in tone map response information as defined in the G3-PLC standard so as to choose a transmission mode from among the multi-band communication modes (in ROBO mode in each band) or else in hyper-robust mode, and may therefore opt for different communication modes. In this case, one of the node devices has to adapt its transmission mode such that it is then compatible with the configuration mode chosen by the other node. It thus has to be capable of changing from multi-band transmission mode through fragmentation with ROBO modulation in each band to hyper-robust mode if it detects that the other node device is communicating in robust mode H-ROBO.

Figure 5:
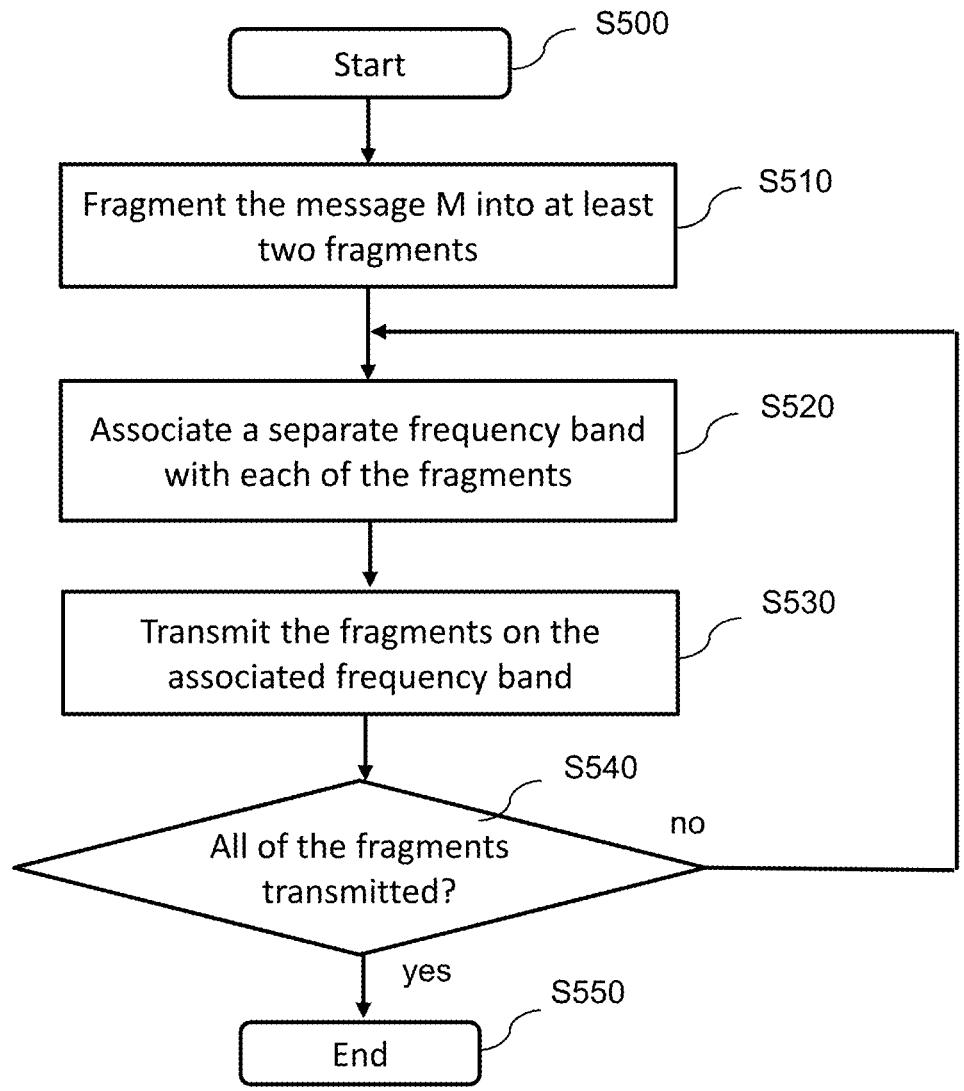
FIG. 5 is a flowchart illustrating a third embodiment using a transmission of a fragmented message on a plurality of separate frequency bands.

FIG. 5 schematically illustrates a method for transmitting a message according to a third embodiment. A message M is to be transmitted by a source node device (for example the node device 133) to a receiver node device belonging to its network neighbourhood (for example the node device 134). This embodiment is described in particular in connection with the G3-PLC communication standard. However, it is not limited to this standard alone and could be applied to other standards, for example to the PRIME (for "PoweRline Intelligent Metering Evolution") specifications, that is to say in particular in a power line communication network that does not have a meshed structure but that has a tree structure.

The method starts in a step S500. In a step S510, the message M, which is for example encapsulated in an IP packet, for example an IPv6 packet (packet of a size up to 1500 bytes), is fragmented into at least two fragments in order to adapt it to the constraints of the MAC layer, and in particular to the size of MAC frames.

To this end, the G3-PLC standard incorporates the 6LoW-PAN protocol, which makes it possible to adapt IPv6 data packets to the constraints of the G3-PLC communication standard, in particular by fragmenting them. Specifically, the MAC frames used by the G3-PLC standard are far smaller in size than IPv6 packets of 1500 bytes (that is to say 400 bytes available at most per packet for the IP portion).

The 6LoWPAN adaptation layer is located between the network layer and the MAC sublayer of the OSI model. It receives IPv6 packets of 1280 bytes from the network layer and fragments them where applicable. Of course, in the case of an IPv6 packet small enough to be contained within a single G3-PLC MAC frame, no fragmentation is performed. The method is therefore applicable if the message M has a length such that it needs to be fragmented.

Each fragment is generally preceded by a fragmentation header, for example a header comprising 4 or 5 bytes. This header contains for example the following information: Five bits for identifying that it is a fragment. The first fragment will have the value "11000" and the following ones will have the value "11100"; eleven bits of indicating the size of the IP packet before fragmentation ("datagram_size" field); sixteen bits for indicating an identifier ("datagram_tag" field) common to all of the fragments of the same IP packet; and eight bits for indicating the position ("datagram_offset" field) of the fragment in the IP packet (present only in the fragments following the first one). It should be noted that the fragmentation is described in section 5.3 of the RFC 4944 recommendation (published in September 2007).

In a step S520, a first separate frequency band is associated with a first fragment from among said at least two fragments resulting from the fragmentation of the message M, and a second separate frequency band, different from the first frequency band, is associated with the other of said at least two fragments. The first and second associated frequency bands are for example selected from among the plurality of frequency bands defined in the G3-PLC communication standard, i.e. CENELEC A, CENELEC B, and ARIB or FCC. According to one variant, the associated first and second separate frequency bands are selected from a subset of frequency bands defined in the G3-PLC communication standard, the subset comprising at least two bands from among all of the bands authorized by G3-PLC. Thus, according to the invention, fragments originating from one and the same IP packet may be associated with a view to transmitting them with different frequency bands. The embodiment described for two fragments may be transposed to cases for which more than two fragments are defined, for example N fragments, where N is a natural integer. In this case, one and the same separate frequency band may be associated with various fragments. However, different separate frequency bands are then associated with at least two fragments of the message M from among the N fragments.

In one particular embodiment, the separate frequency bands are associated alternately with the fragments. For example, if two frequency bands are to be associated, the first frequency band is associated with the odd fragments (i.e. fragments 1, 3, 5, etc.) and the second frequency band is associated with the even fragments (i.e. fragments 2, 4, 6, etc.). In other words, two successive fragments in the message M are transmitted in different separate frequency bands.

In a step S530, the fragment is transmitted on the frequency band that is associated therewith. The various fragments may thus advantageously be transmitted in parallel on different frequency bands. Transmitting a fragment on the medium, i.e. on the power line, conventionally comprises various steps, in particular segmenting the fragments in order to adapt them to the physical layer and OFDM modulation of the signal. The segmentation consists in partitioning an MAC (acronym for "Media Access Control") frame into PSDUs (acronym for "PHY Service Data Unit"). All of the PSDUs originating from one and the same fragment are modulated using one and the same modulation scheme.

Figure 6:
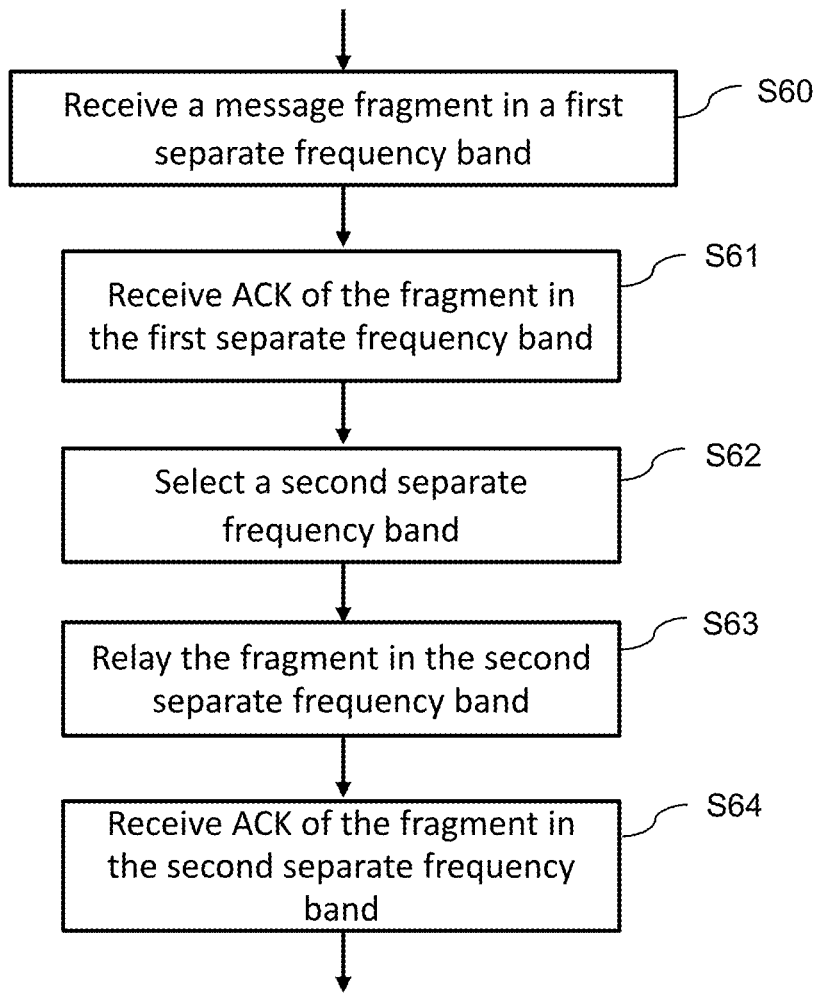
FIG. 6 is a flowchart illustrating a fourth embodiment intended to optimize the transmission time of a message in multi-band mode.

In a step S540, if all of the fragments have been transmitted, then the method is ended (S550). If not, the method resumes at step S520 with the next fragment to be transmitted. FIG. 6 schematically illustrates a method for relaying a message M received by the first node device 133 from a third node device to the second node device 134, according to a fourth embodiment. According to this fourth embodiment, at least two separate frequency bands are used in one and the same given geographical region. According to one embodiment, the algorithm described by the flowchart of FIG. 6 is able to be executed by each of the node devices of the communication network 120.

The present algorithm is thus described below according to one example in which it is executed by the first node device 133, the second node device being the node device 134 and the third node device being the node device 137.

In step S60, the node device 133 receives a fragment in a first separate frequency band from the node device 137. Transmitting a fragment on the medium, i.e. on the power line, conventionally comprises various steps, in particular segmenting the fragments in order to adapt them to the physical layer and OFDM modulation of the signal. The segmentation consists in partitioning an MAC (acronym for "Media Access Control") frame into PSDUs (acronym for "PHY Service Data Unit"). All of the PSDUs originating from one and the same fragment are modulated using one and the same modulation scheme.

In a step S61, the node device 133, after demodulation and decoding of the received fragment using the demodulation and decoding scheme of the first separate frequency band, transmits an acknowledgement message to the node device 137. In a step S62, the node device 133 selects a second frequency band from among the set of separate frequency bands, different from the first frequency band and that is a frequency band on which the second node device 134 is able to transmit and receive messages. Next, in a step S63, the first node device 133 relays the fragment received from the third node device 137 to the second node device 134, after having modulated and coded the decoded and demodulated fragment using the coding and modulation scheme of the selected separate frequency band. Finally, in a step S64, the first node device 133 receives an acknowledgement message from the second node device 134 receiving the relayed message.

Figure 7:
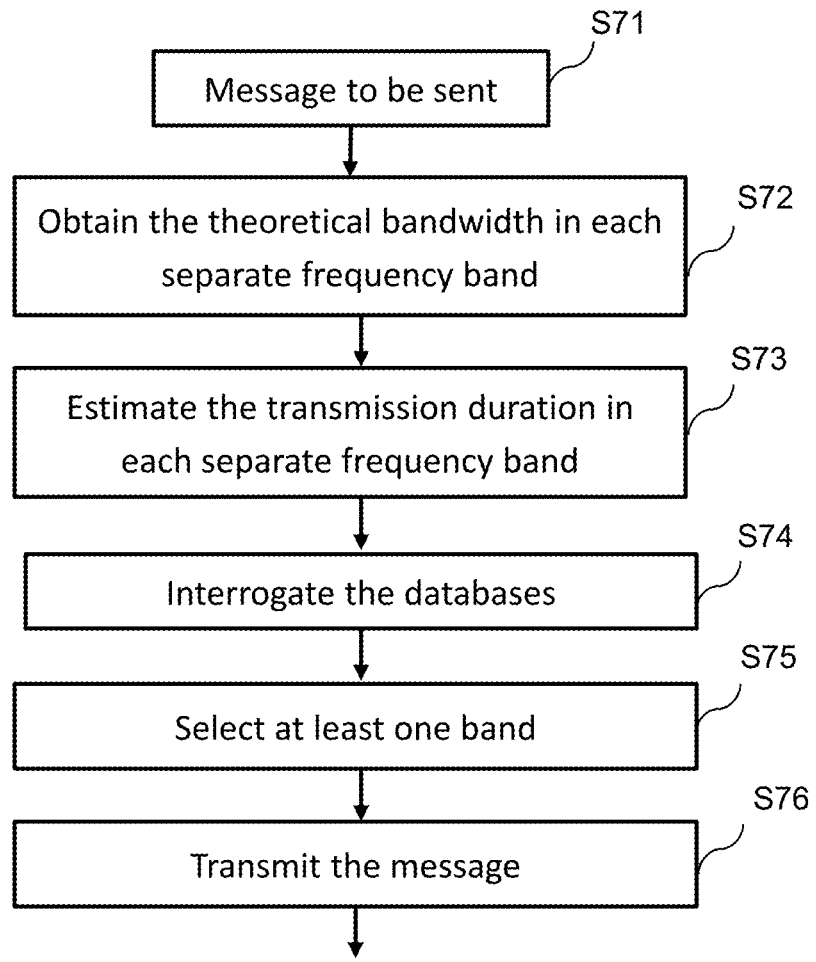
FIG. 7 is a flowchart illustrating a fifth embodiment intended to optimize the bandwidth for a transmission in multi-band mode.

FIG. 7 schematically illustrates a method for selecting at least one frequency band of the communication network to transmit a message according to a fifth embodiment. The method described here may be executed each time a message M is sent by each node device that is able to transmit and receive messages on a plurality of separate frequency bands of the communication network 120.

The associated separate frequency bands are for example selected from the plurality of separate frequency bands defined in the G3-PLC communication standard, i.e. CENELEC A, CENELEC B, and ARIB or FCC.

In a step S71, a node device, for example the node device 133, has a message to send on the communication network 120. In a step S72, the node device 133 obtains a theoretical data rate for each of the separate frequency bands on which the node device 133 is able to transmit and receive messages. As mentioned above, each separate frequency band has a given theoretical data rate for each modulation type used in this separate frequency band. The node device 133 obtains the theoretical data rate of each frequency band on which the node device 133 is able to transmit and receive messages corresponding to the modulation used to send the message to the node to which the message is to be transferred. In a step S73, the node device 133 estimates, for each of the separate frequency bands, the theoretical transmission duration of the message in this separate frequency band, and then, in a step S74, the node device 133 interrogates a database in order to obtain occupancy level integration results for the separate frequency band corresponding to the theoretical transmission duration of the message in each frequency band. The node device 133 thus obtains, for each separate frequency band, a number of integration results during a first time scale corresponding to the theoretical transmission duration of the message in the separate frequency band in question. The node device 133 also obtains a number of integration results during a second time scale corresponding to the time at which the message should be sent. The node device 133 lastly obtains a number of integration results during a third time scale corresponding to the date at which the message should be sent. In a step S75, the node device 133 selects the separate frequency band from among the separate frequency bands for which the occupancy level integration results are lowest. For example, the node device 133 calculates, for each separate frequency band, the average of the integration results during the first, second and third time scales and selects the separate frequency band for which the calculated average is lowest. According to one variant, a weighting coefficient is assigned to the integration results during the first, second and third time scales before the average is calculated. By way of example, a weighting coefficient of 10 is assigned to the integration results during the first time scale, a weighting coefficient of 12 is assigned to the integration results during the second time scale and a weighting coefficient of 7 is assigned to the integration results during the third time scale. Finally, in one step, the node device 133 transfers the message into the selected separate frequency band.

Figure 8:
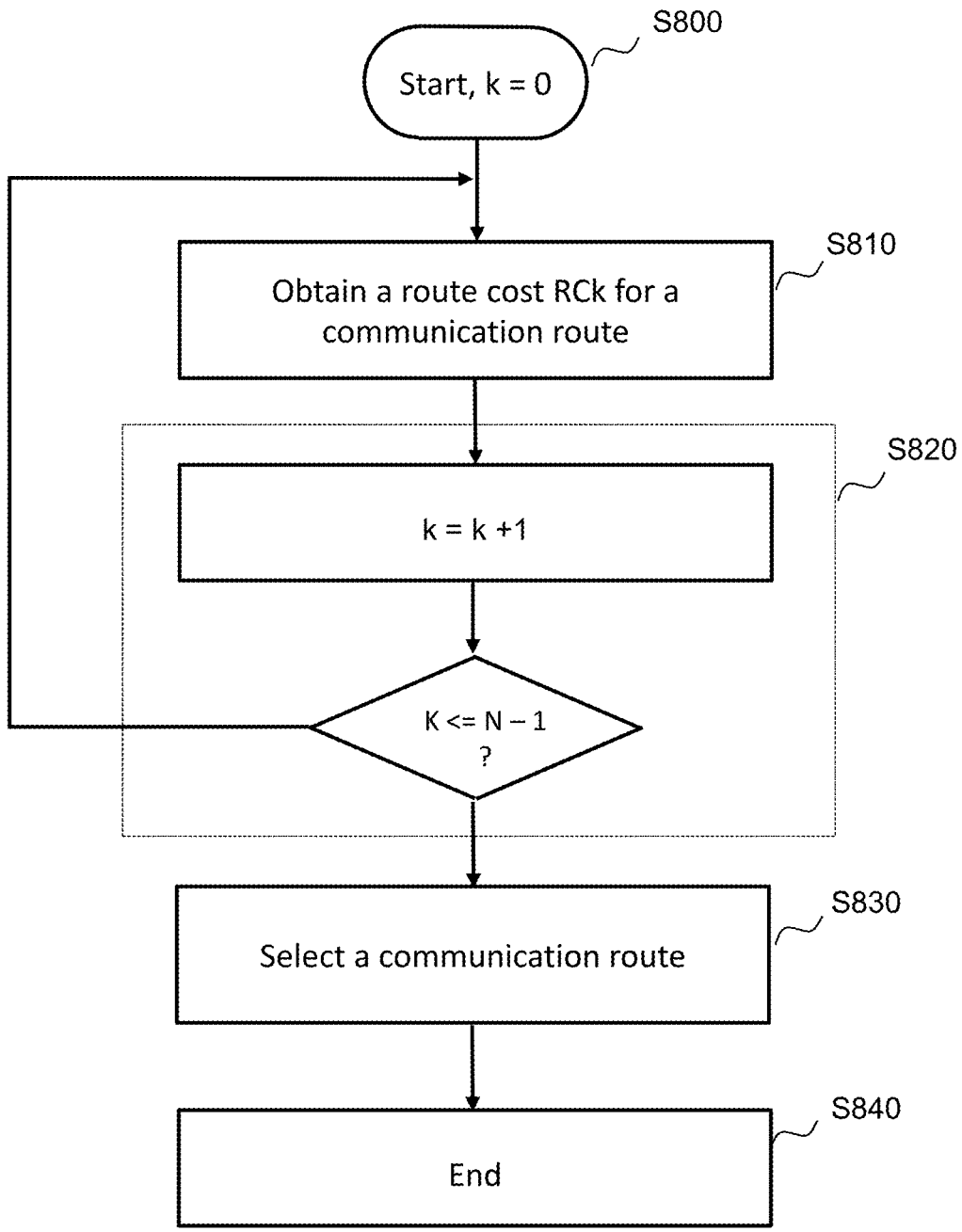
FIG. 8 is a flowchart illustrating a sixth embodiment comprising calculating route costs for communication in multi-band mode.

FIG. 8 schematically illustrates a method for selecting a communication route between a first node device and a second node device of the communication network 120, which is a meshed electricity supply network using power line communications, according to a sixth embodiment.

The second node device, for example the node 132, is reachable from the first node device, for example 133, via at least one first communication route, for example the route passing through the nodes 130, 131 and a second communication route, for example the route passing through the nodes 134, 135 and 136, different from said first communication route. In general, the second node device is reachable from the first node device through a plurality of N communication routes, N being a positive integer. Hereinafter, to facilitate the notations, each possible route is identified by an index k, where k is an integer varying from 0 to N−1.

The method starts in a step S800 where k is equal to zero.

In a step S810, the second node device obtains a route cost $RC_k$ for a communication route of index k from among the plurality of N communication routes. The route cost $RC_k$ is equal to the sum of the costs of links $LC_{i,j}$ between two successive node devices i and j, i.e. located in the same network neighbourhood. For example, in the case of the first communication route, the cost of the route $RC_1 = L_{133,130} + L_{130,131} + L_{131,132}$ and the cost $RC_2$ of the second communication route are equal to $L_{133,134} + L_{134,135} + L_{135,136} + L_{136,132}$. The cost of a link $LC_{i,j}$ between two successive node devices depends on the maximum value out of a cost of the link $LC_{i \to j}$ in the forward direction, i.e. from the transmitter node device to the receiver node device, and a cost of the link $LC_{j \to i}$ in the backward direction, i.e. from the receiver node device to the transmitter node device.

Thus, in one particular embodiment, the cost of the link $LC_{i,j}$ between a node device i and a node device j belonging to its network neighbourhood is equal to a weighted sum of a maximum value out of a cost of the link in a forward direction $LC_{i \to j}$ and a cost of the link in a backward direction $LC_{j \to i}$ and a ratio between a number of active routes and a maximum number of active routes. For example, the cost of the link $LC_{i,j}$ is calculated as follows:

$$LC_{i,j} = \max(LC_{i \to j}, LC_{j \to i}) + adpKrt * \frac{\text{Number Of Active Routes}}{\text{Maximum Number Of Active Routes}} + adpKh$$

where $LC_{i \to j}$ and $LC_{j \to i}$ are the costs of the directional links (forward and backward directions, respectively) between the node device i and the node device j;

max(a,b) is a function that returns the value a if a>b and b if not,

NumberOfActiveRoutes is the number of active routes in the internal routing table of the node device j;

MaximumNumberOfActiveRoutes is the maximum number of active routes in the internal routing table of the node device j;

adpKh is a weighting factor representative of the cost of a hop;

and adpKrt is a weighting factor associated with the number of active routes in the routing table of the node device j.

By way of example, adpKrt has the value 0 and adpKh has the value 4.

It should be noted that the value adpKh is added in each step S810. At the end, the second node device may compare the potential routes, and define a preference for the one that has the fewest hops.

According to one particular embodiment, a specific metric is defined to determine the costs of the directional links so as to adapt to node devices that have multi-band transmission capabilities. A node device has multi-band capabilities if it is configured so as to be able to simultaneously use a plurality of separate frequency bands, for example CENELEC-A and FCC, rather than choosing and operating in a single separate frequency band. For example, the node device in question may fragment the message into various fragments in accordance with the 6LoWPAN protocol. The fragmentation method is described more particularly in section 5.3 of the RFC 4944 recommendation (published in September 2007). Each fragment is then sent independently from the other fragments on frequency bands that may be different. The associated frequency bands are for example selected from the set of frequency bands authorized by G3-PLC, i.e. CENELEC A, CENELEC B, ARIB and FCC. In one variant, the first and second associated frequency bands are selected from a subset of frequency bands authorized by G3-PLC, the subset comprising at least two bands from among all of the bands authorized by G3-PLC.

In another embodiment, a node device having multi-band capabilities may transmit the same message simultaneously in all of the frequency bands of the set of frequency bands managed (by the transmitter and the receiver). This transmission mode is hereinafter called hyper-robust mode. The G3-PLC robust mode is then used in each frequency band. In the event of widespread frequency interference on one frequency band, the message may thereby still manage to change to another frequency band. Specifically, the receiver only needs to manage to capture the message on one of the frequency bands on which it was transmitted. Hyper-robust mode is a specific newly defined mode for the case of node devices having multi-band capabilities.

In another embodiment, a node device having multi-band capabilities may transmit a message on the set of frequency bands, which then form what is called an extended frequency band.

In all of these embodiments, the multi-band capability of a node device is characterized in that the node is capable of using a plurality of frequency bands simultaneously rather than just a single band, as is conventionally the case in the case of the G3-PLC standard. A device having multi-band capabilities may benefit from the characteristics of the various frequency bands in terms of bit rate, range and resistance to interfering factors.

The route cost as defined by G3-PLC in its Annex D does not make it possible to take into account these multi-band capabilities of a node device. Specifically, the G3-PLC communication standard permits the use of only one frequency band for a given network. According to one particular embodiment, the cost of the link $LC_{i \to j}$ in a given direction, i.e. in the forward or backward direction, depends on the cost of the link, in said given direction, calculated for each frequency band $LC_{i \to j}[m]$ of the set of frequency bands used by said two successive node devices i and j to communicate, said set comprising at least two different frequency bands.

The index k is incremented by 1 and compared to N−1 in a step S820, and k is incremented by 1 and compared to N−1. If k is less than or equal to N−1, then the method continues in step S810, and if not it continues in step S830.

In a step S830, the second node device selects, from among said N communication routes, the communication route corresponding to the smallest route cost.

The method of FIG. 8 ends in step S840.

According to this embodiment, a cost $LC_{i \to j}$ of a directional link between a first node device and a second node device is calculated based on a directional link cost $LC_{i \to j}[m]$ per separate frequency band, m being an index identifying the frequency band, and m is an integer varying from 0 to NBP−1, where NBP is an integer equal to the number of separate frequency bands able to be used. For example, NBP may be equal to 4. According to one example, an index m equal to 0 corresponds to the CENELEC-A band, an index m equal to 1 corresponds to the FCC band, an index m equal to 2 corresponds to the CENELEC-B band and an index m equal to 3 corresponds to the ARIB band.

This method begins in a step S8100 when m has a value of zero.

In a following step S8110, the link cost $LC_{i \to j}[m]$ is calculated as follows:

$$LC_{i \to j}[m] = adpKr * \text{MOD}_{Kr} + adpKm * \text{MOD}_{Km} + adpKc[m] * \frac{(\text{Maximum Number Of Tones} - \text{Number Of Active Tones})}{\text{Maximum Number Of Tones}} + adpKq * \text{MAX}\left(0, \text{MIN}\left(1, \frac{adpHighLQIValue - LQI}{adpHighLQIValue - adpLowLQIValue}\right)\right)$$

where:

$MOD_{Kr}=1$ for robust mode and 0 for other modulations,
$MOD_{Km}=3$ for DBPSK or BPSK modulations (including robust mode), 2 for DQPSK or QPSK modulations, 1 for DBPSK or 8-PSK modulations and 0 for modulations. 16-QAM, adpKr, adpKm, adpKq are weighting factors whose values are predefined;

adpKr is a weighting factor associated with robust mode;
adpKm is a weighting factor associated with the modulation; and adpKc[m] is a weighting factor defined for each frequency band and is associated with the number of active subcarriers with respect to the total number of available subcarriers.

By way of illustrative example, adpKc[0]=2 and adpKc[1]=1, adpKc[0] being associated with the CENELEC-A band and adpKc[1] being associated with the FCC band.

Specifically, the FCC band offers more subcarriers than the CENELEC-A band, and it is therefore logical to have an adpKc[1] lower than adpKc[0] so as to take into account and thus obtain a comparable result between the various bands.

LQI (acronym for "Link Quality Indicator") is a value representative of the quality of the link between the node devices i and j, the node j being the current node;

adpHighLQIValue is a value representative of a threshold above which an LQI value is considered to express a link considered to be "reliable";

adpLowLQIValue is a value representative of a threshold below which an LQI value is considered to express a link considered to be "unreliable";

adpKq is a weighting factor associated with the indicator LQI;

MaximumNumberOfTones is the number of available tones/subcarriers, for example MaximumNumberOfTones is equal to 36 for CENELEC-A and 72 for FCC. A tone map is a list of subcarriers used to communicate in a given separate frequency band. These subcarriers are chosen so as to experience the smallest possible amount of interference given the environment; and NumberOfActiveTones is the number of active tones/subcarriers. It should be noted that the tone map indicates a number of active "groups of subcarriers" (by setting corresponding bits to 1). The number of active subcarriers is obtained by multiplying this number of "groups of subcarriers" by the number of subcarriers per group, for example 3 in FCC and 6 in CENELEC-A.

It should also be noted that the values of the various parameters adpX, where X=Kq, HighLQIValue, LowLQIValue, Kc[m], etc. that are mentioned may be adjusted depending on experience in the field and transmitted via the application layer of the apparatuses. Some of these values may be equal to 0.

In a step S8120, m is incremented by 1 and compared to the number NBP−1. If m is less than or equal to NBP−1, then the method continues in step S8110, and if not it continues in sequence in a step S8130.

Once the cost of a link $LC_{i \to j}[m]$ has been calculated for all of the separate frequency bands able to be used, the smallest value $Min\_LC_{i \to j}$ is determined in a step S8130. $Min\_LC_{i \to j}$ corresponds to $m=m_0$ i.e. $Min\_LC_{i \to j}=LC_{i \to j}[m_0]$.

In a step S8140 following step S8130, the overall directional cost $LC_{i \to j}$ is calculated. According to a first embodiment, for each $LC_{i \to j}[m]$ other than $Min_{LC_{i \to j}}$, its contribution to improving the overall directional link cost (i.e. $LC_{i \to j}$) is calculated using the following formula:

$$\frac{Min_{LC_{i \to j}} * adpKmb}{LC_{i \to j}[m] * 255}.$$

The overall directional cost $LC_{i \to j}$ is therefore calculated as follows:

$$LC_{i \to j} = adpKhr * MOD_{Khr} + \frac{Min_{LC_{i \to j}}}{1 + \sum_{m=0, m \neq m0}^{NBP-1}\left(\frac{Min_{LC_{i \to j}} * adpKmb}{LC_{i \to j}[m] * 255}\right)} \quad \text{(Eq. 1)}$$

where:

$MOD_{Khr}=1$ for hyper-robust mode, 0 if not;
adpKhr is a weighting factor associated with hyper-robust mode in calculating the link cost, for example adpKhr=4;
adpKmb is a weighting factor for route calculation in the multi-band case, for example adpKmb=130.

To numerically illustrate the result of this first embodiment, we will take for example the case of $LC_{i \to j}[0]=50$ for the CENELEC-A band and $LC_{i \to j}[1]=100$ for the FCC band (without hyper-robust mode). Taking a low weighting factor adpKmb=55, the overall $LC_{i \to j}$ is then equal to 50/(1+50/100*55/255)=45 (with rounding).

Adding the FCC band, even with a high route cost, therefore makes it possible to improve the route cost in comparison with the case of CENELEC-A alone, but in a moderate manner (given the low reward factor).

According to a second embodiment, the following formula is used instead of the formula given by (Eq. 1) to calculate the overall directional cost $LC_{i \to j}$:

$$LC_{i \to j} = adpKhr * MOD_{Khr} + \frac{1}{\sum_{m=0}^{NBP-1}\left(\frac{1}{LC_{i \to j}[m]}\right)} \quad \text{(Eq. 2)}$$

This formula is simpler than that of (Eq. 1) but does not allow weighting by the weighting factor adpKmb. To numerically illustrate the result of this second embodiment, we will take for example the case of $LC_{i \to j}[0]=50$ for the CENELEC-A band and $LC_{i \to j}[1]=100$ for the FCC band (without hyper-robust mode). The overall $LC_{i \to j}$ is then equal to $1/(1/50+1/100)=33$ (with rounding). Adding the FCC band, even with a high route cost, therefore makes it possible to improve the overall cost in comparison with the case of CENELEC-A alone.

In one particular embodiment, hyper-robust mode is not used in equations (1) and (2) and adpKhr has a value of zero.

The calculating method then ends in a final step S8150.

Steps S8100 to S8150 are repeated in order to calculate the overall directional cost $LC_{j \to i}$ and thus to deduce the cost $LC_{i,j}$ therefrom.

Steps S8100 to S8150 are not shown in FIG. 8, but may serve as references for good understanding of the method for calculating the cost $LC_{i,j}$ of a link described above, in particular due to the possible looping back between steps S8120 and S8110.

Figure 9:
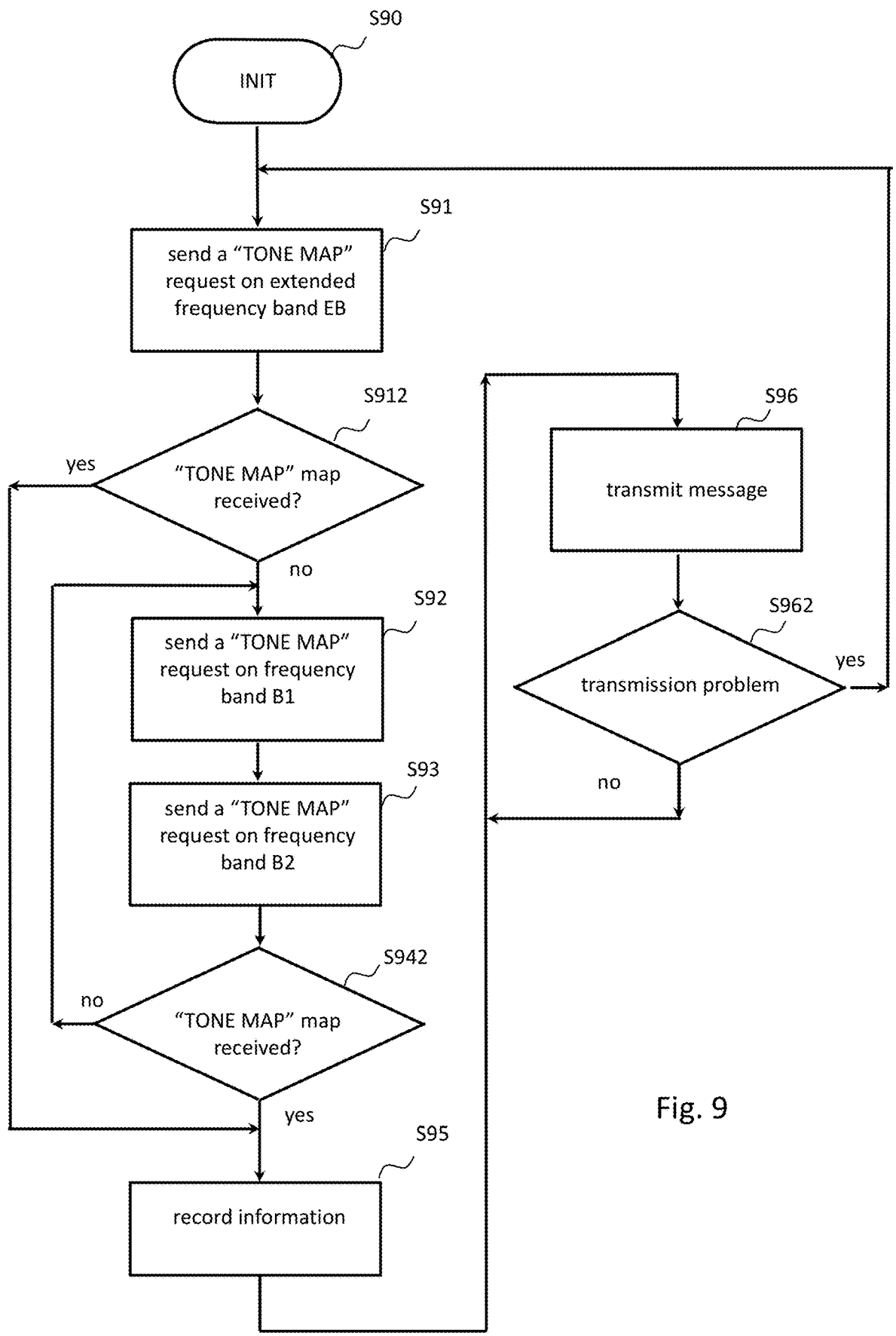
FIG. 9 is a flowchart illustrating a seventh embodiment comprising a node device determining the communication capabilities of a neighbouring node device with a view to communication in multi-band mode.

FIG. 9 illustrates a method for determining a mode of communication between two node devices neighbouring one another in the communication network 120, according to a seventh embodiment. These node devices are by way of example the node device 133 operating as initiator node device and the neighbouring node device 134, operating as a target node device.

At the end of an initialization step S90, the node devices 133 and 134 are configured so as to communicate with one another in at least one communication mode for communicating in at least one separate frequency band. It is considered that the node devices 133 and 134 are then normally operational, at this stage, and that a message exchange may be initiated. According to the embodiment illustrated in FIG. 9, the initiator node device 133, in step S91, sends a message comprising information according to which a channel estimate request in an extended frequency band EB is requested from the target node device, and awaits a possible message in response for a predetermined time. At the end of the predetermined period, the initiator node device 133, in step S912, checks whether a response has actually been received in the form of a message comprising information representative of a channel estimate in the frequency band EB. If so, the initiator node device 133, in step S95, records the received information representative of a channel estimate in the extended frequency band EB in its neighbourhood table NT-REC, and determines a preferred communication mode, taking into account in particular the various information available in the neighbourhood table NT-REC. For example, the initiator node device 133 determines that the communication mode for communicating in an extended frequency band EB is the most advantageous communication mode at this time for communicating with the target node device 134, and initiates transmission in this mode, in the extended frequency band EB, in step S96.

According to the embodiment, in the absence of any response from the target node device 134 after a predetermined time, the initiator node device 133 considers that the target node device 134 does not support communication in a communication mode for communicating in the extended band and, in steps S92 and S93, sends messages comprising a channel estimate request in the frequency band B1 and a channel estimate request in the frequency band B2, respectively. The initiator node device 133 then awaits a possible response to at least one of these two messages, or to each of these two messages, and records the information representative of one or more channel estimates received in response in one or more neighbourhood tables NT-REC, before communicating only subsequently in step S6. If no message is received in response to a channel estimate request transmitted by the initiator node device, in step S942, the method returns to step S92 and the initiator node device again sends messages to the target node device until a response is obtained in at least one of the two frequency bands B1 and B2. A new message comprising a channel estimate request (TMR indicator set to 1, for example, in G3-PLC) may be sent as soon as data have to be transmitted to the target node device 134.

When communications are established in step S6, in a given communication mode between the two node devices, and in the absence of any communication problem detected in step S962 intended to define a communication quality level, communications continue in the selected communication mode. By contrast, if a communication quality problem is detected, the determination method is relaunched starting from step S91.

Advantageously, determining the transmission mode comprises a step of comparing first transmission quality indicators that are respectively determined, for each frequency band, based on recorded information associated with each of the at least two frequency bands B1 and B2. If the received information, representative of one or more channel estimates, indicates that the available separate frequency bands exhibit significant interference, determining the transmission mode may furthermore comprise selecting what is called a "robust" transmission mode using BPSK modulation and systematic repetition of the transmitted bits (for example, each bit is repeated four times or six times during a transmission). The selection of what is called a "robust" transmission mode depends for example on a transmission quality level defined based on an estimate of a transmission channel established via a multi-band transmission in said at least two frequency bands B1 and B2.

Figure 10:
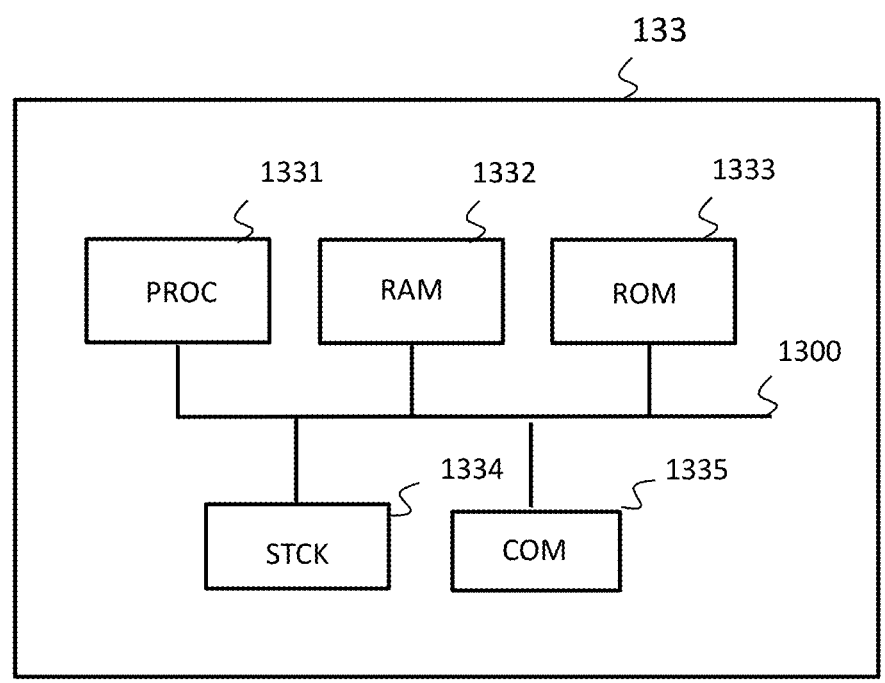
FIG. 10 schematically illustrates the internal architecture of a node device of the communication network already illustrated in FIG. 1.

FIG. 10 schematically illustrates an exemplary internal architecture of any node device of the communication network 120. It will be considered by way of illustration that FIG. 10 illustrates an internal layout of the node device 133. Such a node device is said to be multi-band since it is capable of transmitting a message on a plurality of separate frequency bands used in parallel. It will be noted that FIG. 10 could also schematically illustrate an exemplary hardware architecture of a processing module contained within the node device 133.

According to the exemplary hardware architecture shown in FIG. 10, the node device 133 then comprises the following, connected by a communication bus 1300: a processor or CPU ("Central Processing Unit") 1331; a RAM ("Random Access Memory") 1332; a ROM ("Read Only Memory") 1333; a storage unit such as a hard disk (or a storage medium reader, such as an SD ("Secure Digital") card reader 1334; at least one communication interface 1335 allowing the node device 133 to communicate with the node devices belonging to its network neighbourhood, such as for example the node devices 134 and 137.

The processor 1301 is capable of executing instructions loaded into the RAM 1332 from the ROM 1333, from an external memory (not shown), from a storage medium (such as an SD card), or from a communication network. When the node device is turned on, the processor 1331 is capable of reading instructions from the RAM 1332 and executing them. These instructions form a computer program that causes the processor 1331 to implement all or some of the exchanges and methods described with reference to the abovementioned figures illustrating a method according to a previously described embodiment.

All or some of the exchanges and methods described with reference to the abovementioned figures may be implemented in software form by executing a set of instructions using a programmable machine, for example a DSP ("Digital Signal Processor") or a microcontroller, or be implemented in hardware form by a machine or a dedicated component, for example an FPGA ("Field-Programmable Gate Array") or an ASIC ("Application-Specific Integrated Circuit"). In general, the node device 133 comprises electronic circuitry configured so as to implement the methods described with reference to the node device 133 (likewise the node device 134).

Figure 11:
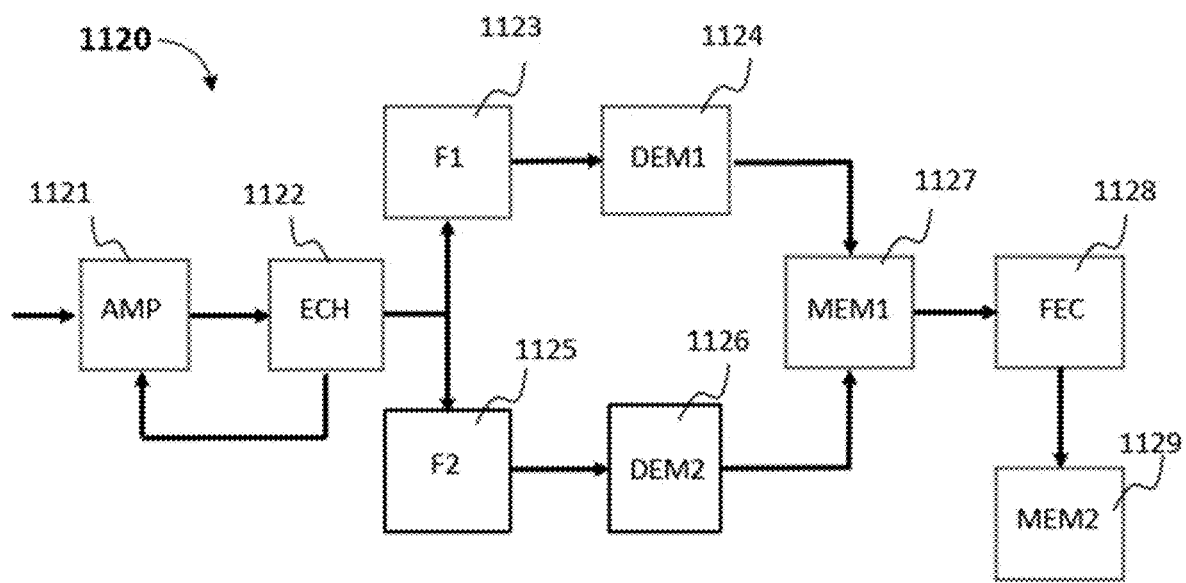
FIG. 11 schematically illustrates an exemplary architecture of a reception chain of a node device configured so as to implement a reception mode for receiving in multi-band mode.

FIG. 11 schematically illustrates an exemplary architecture in multi-band reception mode. More specifically, what is illustrated is a reception processing chain 1120 of a node device, such as the node device 134. The reception processing chain 1120 comprises two demodulators DEM 1 1124 and DEM2 1126 and may therefore process reception in single-band mode, in multi-band mode or in extended frequency band mode (here with the convergence of two separate frequency bands). The processing chain 1120 comprises a programmable gain stage AMP 1121 configured so as to support any input dynamics of the multiple frequency bands and avoid any saturation of the signals of one of the separate frequency bands. An analogue-to-digital conversion stage ECH 1122 performs the conversion and controls the gain of the programmable gain stage AMP 21. The conversion stage ECH 22 is pooled and the sampling frequency is defined with respect to the sampling frequency required in the separate frequency band having the highest frequency. The data transmitted in the various frequency bands are then separated using respective digital filters F1 1123 and F2 1125. Since the frequency bands are separate, their respective signals are thereby easily able to be distinguished. The data at the output of each of the digital filters F1 and F2 are then transmitted, respectively, to the demodulators DEM1 1124 and DEM2 1126. The output from the demodulators DEM1 1124 and DEM2 1126 is processed by a decoder FEC 1128 by way of a first memory MEM1 1127, called de-interleaving memory. The data are loaded in a predefined layout so as to be able to de-interleave them in a plurality of de-interleaving modes that correspond to the inverse of the interleaving operations performed at transmission. A de-interleaving circuit of the decoder FEC 1128 reads the data in the first de-interleaving memory MEM1 1127 and is configured so as to check whether the de-interleaved data appear to be coherent. If the de-interleaved data appear to be coherent, they are recorded in a second memory MEM2 1129, called reception memory of the MAC link sublayer. The data thus stored in the reception memory MEM2 1129 form data frames that are ready to be processed by the MAC layer of the ISO model. The coherence of the de-interleaved data in accordance with a de-interleaving mode specific to a transmission in an extended frequency band is first of all checked. If the data are not coherent, this means that another transmission mode was used to transmit the data, and a second de-interleaving operation, by way of each of the single-band de-interleaving tables, is performed. The architecture that is presented is not limiting, and a node device may for example comprise three or more demodulators (and their corresponding filters), depending on the number of frequency bands in which it has to be able to receive data.

The methods described above according to the various embodiments are particularly advantageous in the context of a G3-PLC meshed network for increasing communication performance between node devices of such a network.

Of course, the described embodiments are not exclusive, and may be combined. Thus, for example, a node device being configured so as to transmit in an extended frequency band may furthermore use a multi-band communication mode that implements fragmentation of a message, each fragment being able to be transmitted on a separate frequency band from among those able to be used. According to another example, a node device configured so as to implement a method for optimizing transmission time may also be configured so as to optimize the bandwidth on the communication network in which it operates.

The invention claimed is:

1. A method for transmitting data, in the form of messages, in a power line communication network, the method being executed in a first node device of said network configured so as to communicate in a plurality of separate frequency bands with a second node device of said network, wherein the first node applies a transmission mode for transmitting by referring to a single extended frequency band comprising at least two separate frequency bands from among said plurality of separate frequency bands, in parallel, each separate frequency band comprising a plurality of subcarriers, the method comprising:
    distributing data to be transmitted in said single extended frequency band into a plurality of groups of data via an interlaying operation, each group being assign to just one of said at least two separate frequency bands, and data in each of the groups being assigned to each of the subcarriers of the frequency to which the group is assigned,
    transmitting the data in each of the plurality of groups of data in the separate frequency band to which the group is assigned such that the data transmission is carried out jointly on all subcarriers of the at least two frequency bands.

2. The method according to claim 1, wherein the data interleaving operation comprises:
    obtaining a first interleaving table T [m, n] of bits representative of the data to be transmitted, the first interleaving table comprising the same number of second interleaving tables Ti [$m_i$, $n_i$] of bits as there are separate frequency bands contained in the extended band, each second interleaving table Ti [$m_i$, $n_i$] being assigned to just one of the at least two separate frequency bands of the extended frequency band, the dimensions $m_i$, $n_i$ of each of the second interleaving tables Ti [$m_i$, $n_i$] being defined in accordance with a modulation type used for the transmission of the data in the separate frequency band to which a second interleaving table is assigned, any differences in dimensions between second interleaving tables being liable to generate one or more positions that are said to be invalid, contained in the first interleaving table but not contained in at least one of the second interleaving tables,
    interleaving the bits by successively shifting the rows m and columns n of the first interleaving table T [m, n], the successive shifts being performed in the form of circular permutations of the bits respectively by row and by column,
    moving any bit detected as being present at an invalid position of the first interleaving table to a position of a said second interleaving table that is available following the interleaving of the bits of the first interleaving table, such that each second interleaving table comprises bits assigned to one of said groups of data,
    directing the bits of each of the groups of data to electronic circuitry configured so as to modulate and transmit said bits.

3. The method according to claim 1, the method comprising the following steps prior to the transmission of a message:
    estimating, for each separate frequency band, a transmission duration of said message in this frequency band,
    obtaining, from a database, occupancy level integration results for each frequency band, determined during a plurality of time scales corresponding to the theoretical transmission duration of said message in each frequency band,
    selecting a frequency band based on the occupancy level integration results for each frequency band determined during a plurality of obtained time scales, and
    transmitting said message in the selected frequency band.

4. The method according to claim 1, wherein the second node device is reachable from the first node device through at least two different communication routes, the method comprising:
  obtaining a route cost for each of said communication routes; and
  selecting, from among said communication routes, the communication route corresponding to the smallest route cost.

5. The method according to claim 1, the method comprising the following steps:
  transmitting a copy of a first message to the second node device in each of said at least two separate frequency bands, said first message comprising information according to which a channel estimate is requested from the second node device by said first node device,
  receiving a second message transmitted by the second node device on each separate frequency band via which the second node device has received a said copy of the first message, each second message comprising information representative of a channel estimate for the separate frequency band via which said second message is received,
  the first node device recording the information, representative of the channel estimate, contained in each received second message, and
  determining, based on the recorded information, a transmission mode for transmitting a third message to be transmitted subsequently from the first node device to the second node device.

6. The method according to claim 1, wherein said at least two separate frequency bands are chosen from among the following group: CENELEC A frequency band, CENELEC B frequency band, and FCC frequency band or ARIB frequency band.

7. The method according to claim 1, wherein said power line communication network is a G3-PLC meshed network.

8. A node device intended to be used in a power line communication network, the node device being configured so as to communicate in a plurality of separate frequency bands with a second node device of said network and so as to apply a transmission mode for transmitting by referring to a single extended frequency band comprising at least two separate frequency bands from among a plurality of separate frequency bands, each separate frequency band comprising a plurality of subcarriers,
  the node device comprising frequency band comprising a plurality of subcarriers,
  the node device comprising electronic circuitry configures so as to:
    distribute data to be transmitted in said single extended frequency band into a plurality of groups of data via an interleaving operation, each group being assigned to just one of said at least two separate frequency bands, and data in each of the groups being assigned to each of the subcarriers of the frequency band to which the group is assigned,
    transmit the data each of the plurality of groups of data in the separate frequency band to which the group is assigned such that the data transmission is carried out jointly on all of the subcarriers of the at least two frequency bands.

9. The power line communication network comprising a plurality of node devices according to claim 8.

10. A non-transitory information storage medium embodying a computer program product, comprising program code instructions for executing the steps of the method according to claim 1 when said program is executed by a processor of a node device.

11. A method for transmitting data, in the form of messages, in a power line communication network, the method being executed in a first node device of said network configured so as to communicate in a plurality of separate frequency bands with a second node device of said network, the method comprises transmitting a message in a transmission mode using at least two separate frequency bands from among said plurality of separate frequency bands in parallel, and wherein the transmission of a message in a transmission mode using at least two separate frequency bands in parallel comprises using a single extended frequency band comprising at least two separate frequency bands from among said plurality of separate frequency bands, each separate frequency band comprising a plurality of subcarriers, the method furthermore comprising a step of interleaving the data in a message to be transmitted, designed to transmit said data distributed on all of said subcarriers, wherein the second node device is reachable from the first node device through at least two different communication routes, the method comprising:
  obtaining a route cost for each of said communication routes; and
  selecting, from among said communication routes, the communication route corresponding to the smallest route cost.

* * * * *